(12) United States Patent
Creswell et al.

(10) Patent No.: US 6,445,783 B1
(45) Date of Patent: Sep. 3, 2002

(54) SYSTEM AND METHOD THAT PROVIDES SPECIALIZED PROCESSING OF COMMUNICATIONS BASED ON AUTOMATICALLY GENERATED IDENTIFIERS

(75) Inventors: Carroll W. Creswell, Basking Ridge; Gary R. Dalton, Green Brook; Salvatore Richard Lawrence DiRubbo, Port Murray; Daniel Selig Furman, Summit; Shelley B. Goldman, East Brunswick; Barbara A. Hisiger, Martinsville, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/115,311

(22) Filed: Jul. 14, 1998

(51) Int. Cl.[7] .................................................. H04M 3/42
(52) U.S. Cl. .......................... 379/207.13; 379/221.08; 379/114.26
(58) Field of Search ................................. 379/196, 197, 379/201, 207, 229, 230, 221, 114.26

(56) References Cited

U.S. PATENT DOCUMENTS

| | | | | |
|---|---|---|---|---|
| 5,109,408 A | * | 4/1992 | Greenspan et al. | .. 379/88.21 X |
| 5,436,957 A | * | 7/1995 | Mc Connell | ............. 379/88.23 |
| 5,524,145 A | * | 6/1996 | Parker | ......................... 379/197 |
| 5,844,978 A | * | 12/1998 | Reuss et al. | ............. 379/112 X |
| 5,884,193 A | * | 3/1999 | Kaplan | ................ 379/88.23 X |
| 6,175,618 B1 | * | 1/2001 | Shah et al. | ............. 379/114 X |

* cited by examiner

Primary Examiner—Creighton Smith

(57) ABSTRACT

A system and method that provides specialized processing based on the source of the communication and/or type of communication being made. The system includes at least one user device connected to at least one network through a communications link. The network includes a specialized processor that has access to at least one database and which determine the source and/or type of communication being made. The database stores information necessary for identifying the appropriate processing for the type of communication. The specialized processor performs the appropriate specialized processing based on the source and/or type of communication and the information obtained from the database. The method according to the invention includes automatically determining the source and/or type of communication being made. Based on the determined source and/or type of communication, information indicating the specialized processing that is to be performed for that source and/or type of communication is retrieved from the database. Based on the information retrieved, specialized processing identified by the retrieved information is performed on the communication. In this manner, specialized processing of the communication may be automatically performed based on the source and/or type of communication being made.

21 Claims, 4 Drawing Sheets

SYSTEM AND METHOD THAT PROVIDES SPECIALIZED PROCESSING OF COMMUNICATIONS BASED ON AUTOMATICALLY GENERATED IDENTIFIERS

BACKGROUND OF THE INVENTION

1. Field of Invention

The present invention provides a system and method for customized communication processing. More specifically, the present invention provides a system and method for automatically determining the type of call/connection being made and providing specialized processing based on the type of call/connection determined.

2. Description of Related Art

A processing system is known in which telephone calls are routed to a particular database based on the phone number being called. The database and associated system will then provide the user with a menu of options and request the user to enter "1" on the telephone keypad for a particular service, "2" for a different service, etc. Such processing is often found in conjunction with 1-800 telephone numbers. For instance, if a user wishes to order an item from a 1-800 service, the user typically calls the 1-800 number and responds to the recorded message detailing the available options by pressing the appropriate key on the telephone keypad. These options are the same for every customer that calls the 1-800 number and are not customizable to specific customers. Thus, new technology is needed to customize communication processing based on the source and/or type of communication.

SUMMARY OF THE INVENTION

The present invention is directed to a system and method that provides specialized processing based on the type of communication being made. The system includes at least one user device connected to at least one network through a communications link. The network includes at least one specialized processor that has access to at least one database and which determines the source and/or type of communication being made. The database stores information necessary for identifying the appropriate processing for the particular source and/or type of communication. The specialized processor retrieves the appropriate information from the database corresponding to the source/type of communication and performs specialized processing based on the information retrieved.

The method according to the invention includes automatically determining the source and/or type of communication being made. Based on the determined source/type of communication, information indicating the specialized processing that is to be performed for that source/type of communication is retrieved from the database. The communication is then processed using specialized processing identified by the retrieved information. In this manner, specialized processing of the communication may be automatically performed based on the source and/or type of communication.

These and other features and advantages of this invention are described in or are apparent from the following detailed description of the preferred embodiments.

BRIEF DESCRIPTION OF THE DRAWINGS

The preferred embodiments of this invention will be described in detail with reference to the following figures, wherein like numerals represent like elements, and wherein.

DETAILED DESCRIPTION OF PREFERRED EMBODIMENTS

Figure 1:
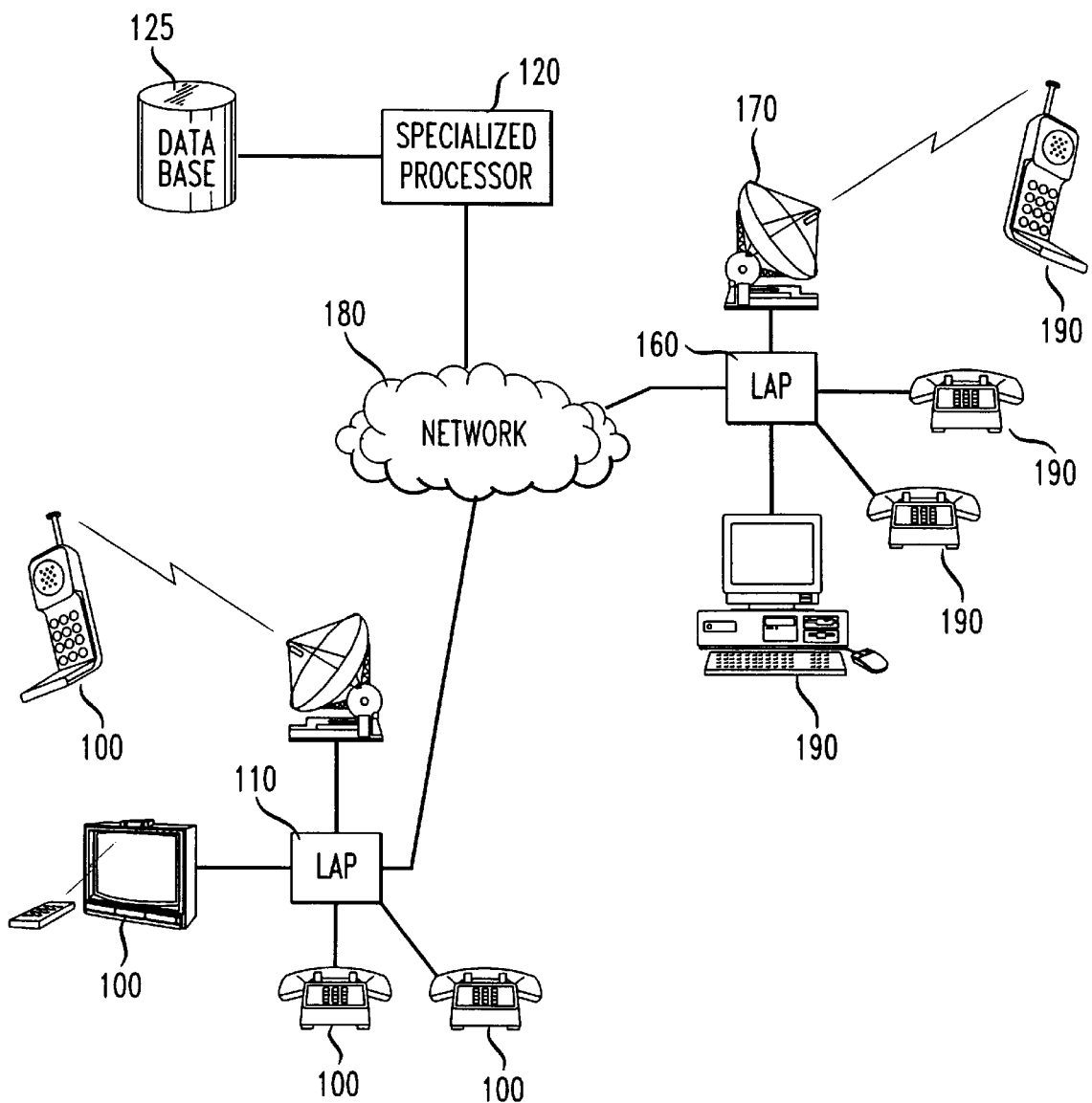
FIG. 1 is a block diagram showing the specialized processing system according to the present invention.

FIG. 1 shows a specialized processing system according to one embodiment of the present invention. The system shown in FIG. 1 includes one or more user devices 100, 190 in communication with at least one network 180 having at least one specialized processor 120 and local access providers (LAPs) 110 and 160. The specialized processor 120 has access to database 125.

The user devices 100 and 190 communicate with one another over the at least one network 180. If the operator of the user device 100 wishes to communicate with the user device 190, the operator need only activate the user device 100 and enter the address of the user device 190. Once a connection is established, communication between the user devices 100 and 190 may commence.

The user devices 100 and 190 may be any such device that allows for the transmission of signals over communications links. For example, the user device may be a telephone, computer, personal digital assistant, point of sale device, intelligent or computer assisted televisions, WebTV™ apparatus, and the like. For simplicity, the following description will assume that the user devices 100 and 190 are telephones with user device 100 being a land-line telephone and user device 190 being a cellular telephone.

The user device 190 is in communication with LAP 160 through cellular communication station 170. The cellular communication station 170 is any type of known cellular communications transceiver as is well known in the art.

The user devices 100 and 190 are in communication with the network 180 through LAPs 110 and 160 over communications links. These communications links may be any type of connection that allows the transmission of data. Some examples include conventional telephone lines, fiber optic lines, direct serial connection, coaxial cable, wireless links and the like.

The user devices 100 and 190 send communication signals to one another over the communications links through LAPs 110 and 160. The communication signals are received by the network 180 and are routed to the receiving user device (either 100 or 190 depending on which is sending the communications signals).

The network 180 may be a single network or a plurality of networks. For example, the network 180 may include a local telephone network (such as a Bell Atlantic telephone network) in connection with a long distance network (such as an AT&T long distance telephone network) or a company's proprietary intranet in connection with an IP data network such as the Internet. The types of networks that may be used include communications networks, cable TV networks, the Internet, private intranets and the like.

The network 180 includes at least one specialized processor 120 that has access to database 125. When the communications signals are received by the network 180, they are routed through the specialized processor 120 where special processing is performed depending on the source and/or type of the communication, as will be described in more detail below.

The specialized processor 120 may be a single processor or may be a distributed processing system incorporated into the network 180. The specialized processor 120 may further be in connection with a plurality of different network types at the same time. For example, the specialized processor 120 may be in connection with both a data network and a telecommunications network and process communications over both networks. For simplicity, the following description will assume a single specialized processor system, as shown in FIG. 1, incorporated into a single network 180 of a telecommunications type.

For simplicity of the following description of the invention, it will be assumed that user device 100 is being operated by a calling party and user device 190 is being operated by a called party. However, the following description will also apply when the user device 190 is being operated by the calling party.

When the calling party places initiates a communication using the user device 100, the specialized processor 120 receives an identifier signal from the user device 100 through LAP 110. The identifier signal may be sent to the specialized processor 120 when the user device is first activated, such as when a receiver is removed from the cradle of a telephone or the power to the user device is turned on. The identifier signal may also be sent when the calling party enters the address, such as a telephone number or Universal Resource Locator (URL), of the user device 190 of the called party through the user device 100 and thereby, sends an address signal to the specialized processor 120. Alternatively, the identifier signal may also be generated by the LAP 110 or network 180 and transmitted to the specialized processor 120 when the address signal is received from the user device 100. The identifier signal may be a separate signal or may be a header on the address signal.

The identifier signal and address signal are transmitted to the network 180 using protocols appropriate for the network 180 on which they are transmitted. For example, a telecommunications network may employ a direct number (DNIS) protocol and a data network may use a transport control program interface protocol (TCP/IP).

The identifier signal includes identifier information that identifies the source of the communication and/or the type of communication being made. For example, the identifying signal may identify the user device 100 by designating the telephone number of the calling party, URL, IP address, the mobile identification number (MN), a unit ID number (in the case when multiple user devices are connected over the same communications link), a trunk/circuit group handling the communication and the like.

The identifier information may also identify the type of communication being made by including information dependent on the address entered. For example, if the calling party enters a 1-800 telephone number through user device 100, the identifier information will include an identifier indicating that the communication is a toll-free telephone call. Likewise, if a particular 1-900telephone number is entered, the identifier information will indicate that the communication is a special type of toll telephone call, i.e. a 900 number toll call. Similarly, if the communication is a calling card telephone call, the identifier information will identify it as such.

The specialized processor 120 retrieves database information from the database 125, based on the identifier information in the identifier signal and/or the address entered. The database information retrieved, identifies the appropriate special processing, if any, associated with the particular identifier information in the identifier signal Based on the database information retrieved from the database 125, the specialized processor 120 performs the appropriate special processing and routes the communication to the receiving party, for example, user device 190.

Thus, with the present invention, processing of communications can be customized based on the source and type of communication being placed. This provides greater versatility in providing individualized service to users of the invention.

The following preferred embodiments of the present invention assume that the identifier signal is provided as a header to the address signal sent from the user device 100 to the specialized processor 120 through LAP 110. The identifier signal may be generated by the user device 100 itself, such as with a MIN or a telephone that includes circuitry for generating an identifier signal, or may be added to the address signal by the LAP 110.

The following embodiments further assume that the combination of the identifier signal and the address signal are used by the-specialized processor 120 to retrieve the appropriate database information from the database 125. However, the retrieval of the database information need not be dependent on both the identifier signal and the address signal in order to practice the invention. On the contrary, retrieval of the database information may be dependent on only the identifier signal. The combination of the identifier signal and the address signal provides greater customization of the specialized processing than the use of only the identifier signal.

Figure 2:
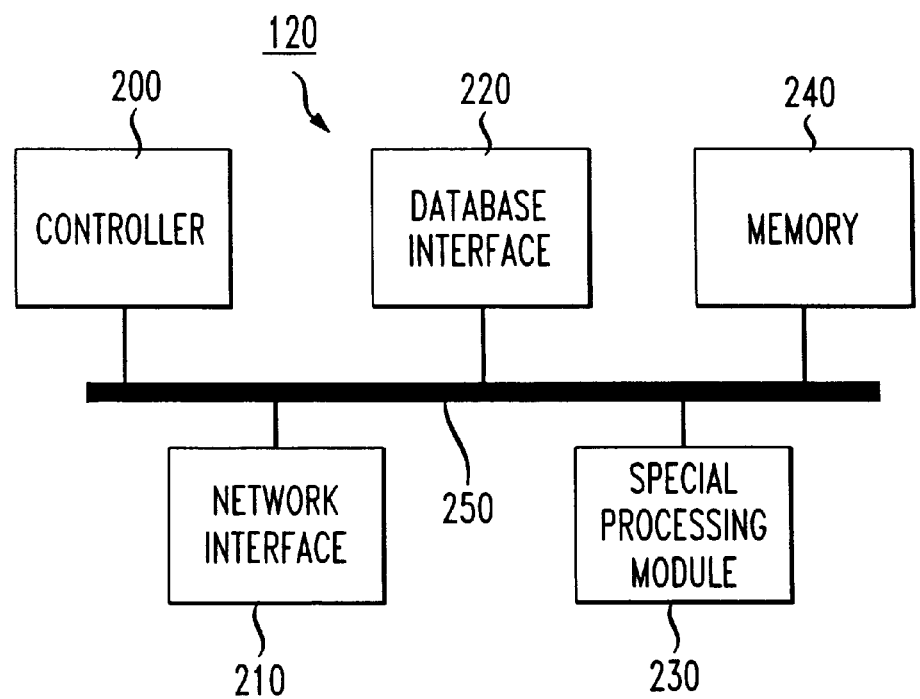
FIG. 2 is a block diagram of the specialized processor of FIG. 1.

FIG. 2 is a block diagram of the specialized processor 120 which includes a controller 200, a network interface 210, a database interface 220, a special processing module 230 and a memory 240. The above components are coupled together through a signal bus 250. The database 125 may be stored in either the memory 240, such as in a local hard disk, or in other storage devices that are in communication with the processor 120 through the database interface 220.

The controller 200 controls the input/output of communications signals through the interfaces 210 and 220, retrieves database information from the database 125 through the database interface 220 and/or the memory 240 based on communication signals received through the network interface 210, and directs the special processing module 230 to perform special processing of the communication signals based on the database information retrieved from the database 125.

Figure 3:
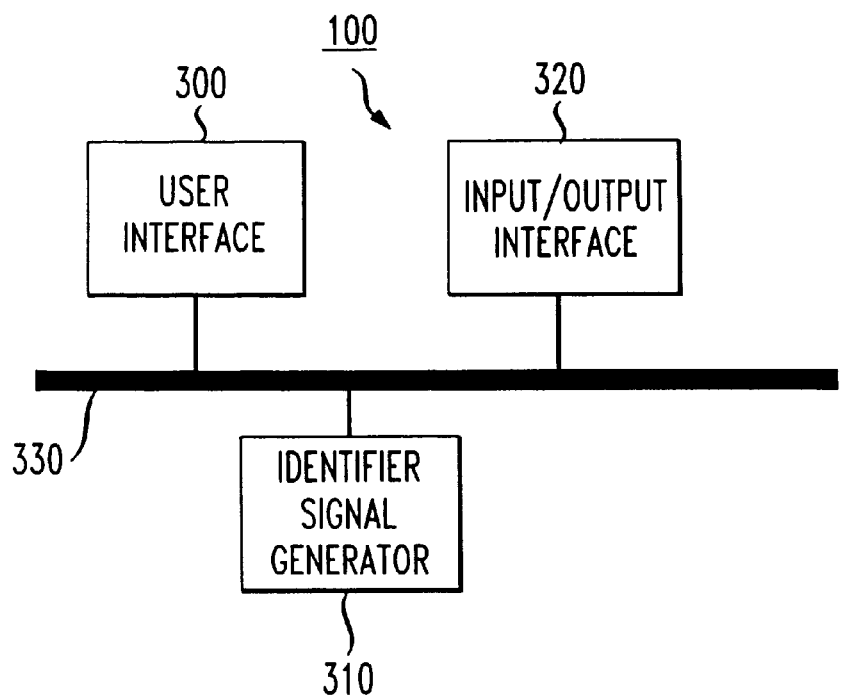
FIG. 3 is a block diagram of the user device of FIG. 1.

When a calling party wishes to initiate a communication with a called party using the user device 100, the calling party activates the user device 100, shown in FIG. 3, by turning the power on, picking up the receiver, and the like, and inputs the address of the called party through the user interface 300. This user interface 300 is typically a keypad but may also include a keyboard, voice recognition device, pointing device, touch screen, graphical user interface (GUI) and the like.

In a preferred embodiment of the invention, when the address of the called party is entered via the user device 100, an identifier signal is generated by the identifier signal generator 310 and added as a header to the address signal generated in response to the entry of the address through user interface 300. This identifier signal is generated automatically either when the user device 100 is activated or when the address signal is generated. This identifier signal may identify the user device 100 or may indicate the type of communication being made based on the address entered. For example, the identifier signal may identify the unit number, MNN, and the like, of the user device 100. Additionally, the identifier signal may include, for example, the Number Plan Area (NPA) or the first three digits of the address entered, e.g. for an address of 800-555-5555, the identifier may be "800", thereby identifying the address as corresponding to a toll free call.

The address signal with the identifier signal header is transmitted from the user device 100 through input/output interface 320 to the specialized processor 120 through LAP 110. The specialized processor 120 receives the combined signal, determines the destination address of the communication and the source/type of communication being made. The specialized processor 120 then retrieves information from the database 125 corresponding to the identifier signal and/or the destination address. Based on the information retrieved from the database 125, the specialized processor 120 performs the special processing functions identified in the database information.

The special processing performed is based on the particular applications to which the present invention is applied. The following examples illustrate specific embodiments of the present invention but are not intended to be exhaustive of the possible applications of the invention. Other applications and embodiments, as are readily apparent to one of ordinary skill in the art, are intended to be within the spirit and scope of this invention.

One application of the special processing system and method according to the present invention involves the situation where multiple user devices are issued based on the same billing account. For example, if a company has multiple telephones issued to their employees, each telephone may have an identification number associated with it. In this way, the company may designate various types of telephone access depending on the identification number of the telephone. For example, telephones that are issued to executives may be provided with unlimited access while telephones issued to lower ranking employees may be barred from various types of telephone calls, such as all long distance calls without the use of a calling card.

Additionally, special processing may be provided for monitoring the duration, destination, etc. of calls for employees having telephones with certain identifying numbers and individual reports may be generated based on the identifying number. In this way, companies may better control the usage of their telephone system and reduce costs.

In another example application, parents may exercise greater control over their children's use of the telephone, Internet access, etc. by practicing the present invention. For example, if the parents provide a telephone for their child, they may have the system and method of the present invention set so that all calls made from their child's telephone, having its own identifier signal, are provided to them on a separate report. The system may further be set so that the child's telephone is restricted from particular numbers, such as 1-900 numbers.

Additionally, the system may be set so that particular numbers dialed by the child will be immediately reported to the parents. For example, if the child dials a 1- 900 number on the telephone, the combination of the identifier signal of the child's telephone and the type of call being placed may be used by the system to determine that an alert message should be sent to the parents that their child has attempted to access a restricted number.

With a data network and Internet access, the present invention provides a system in which the parent may restrict the child from accessing Internet sites that are not approved by the parent. For example, the child may be restricted from sites not having been previously approved by the parent. In this application, the database 125 will include a listing of all approved sites or, on the other hand, may include a listing of all restricted sites. Thus, when the child attempts to access an unapproved site, the child's access will be denied and may be reported to the parents.

Additionally, with digital television, satellite television, cable television and the like, the television may identify itself through its assigned identifier when it is turned on. Based on this identifier and the type of transmission that is to be received, the network may perform special processing on the transmission. Such special processing may include, for example, restricting certain channels, providing low quality/high compression format for devices with small screens, provide closed captioning, and the like.

Likewise, each individual user of digital television, satellite television, cable television, and the like may be issued a personal identifier that provides them with authorization to view certain channels. Thus, a user would enter their personal identifier via an interface on the television and the cable network, satellite network, and the like would provide access to certain channels based on the personal identifier entered. Thus, parents may restrict certain channels from their child's view by issuing the child a personal identifier that prevents those channels from being received. Furthermore, the parents may be able to limit the time of their child's television viewing to a number of hours a day, a week, etc.

The present invention is also well-suited for automatically determining billing information of a user. At present when a person dials a 1-900 number or other designated special toll number, often the telephone company is billed by the person owning the 1-900 number service. The telephone company then pays the owner of the 1-900 number and bills the user for the amount.

With the present invention, the system may be set so that the combination of the type of call and the destination address of the 1-900 call placed by the user provides the necessary information for the system to retrieve information from the database 125 corresponding to the particular billing rates for that particular 1-900 number. In this way, the telephone company may bill the user directly before having to pay the owner of the 1-900 number.

Similarly, with the present status of cellular telephone services, the particular billing plan for which a user subscribes typically must be manually retrieved during each billing cycle to determine how to bill the subscriber. Thus, in order to bill the user correctly, a human operator must look up the service contract of the user and bill them according to the service contract (e.g. no activation charge, $19.95 a month with 20 free minutes off peak time and $0.29 a minute). This obviously leads to many incorrect billing statements due to human error.

With the present invention, the billing plan for which the user subscribes may be included in the database 125 and may be retrieved when the particular identifier signal is obtained by the specialized processor 120. Thus, when the cellular telephone MIN for that particular subscriber is received by the specialized processor 120, it will cause the specialized processor 120 to retrieve the billing information for that cellular telephone MIN so that correct billing of the telephone call is performed.

These example applications may further be applied to particular times of day, week, month and year, may have a specified duration (e.g. limiting the child's use of the telephone, TV or Internet to 1 hour a day), and may designate particular recording processing (e.g. all calls to a particular destination address should be recorded in my voicemail for later retrieval), etc. Many other types of special processing may be provided as is readily apparent to one of ordinary skill in the art.

Figure 4:
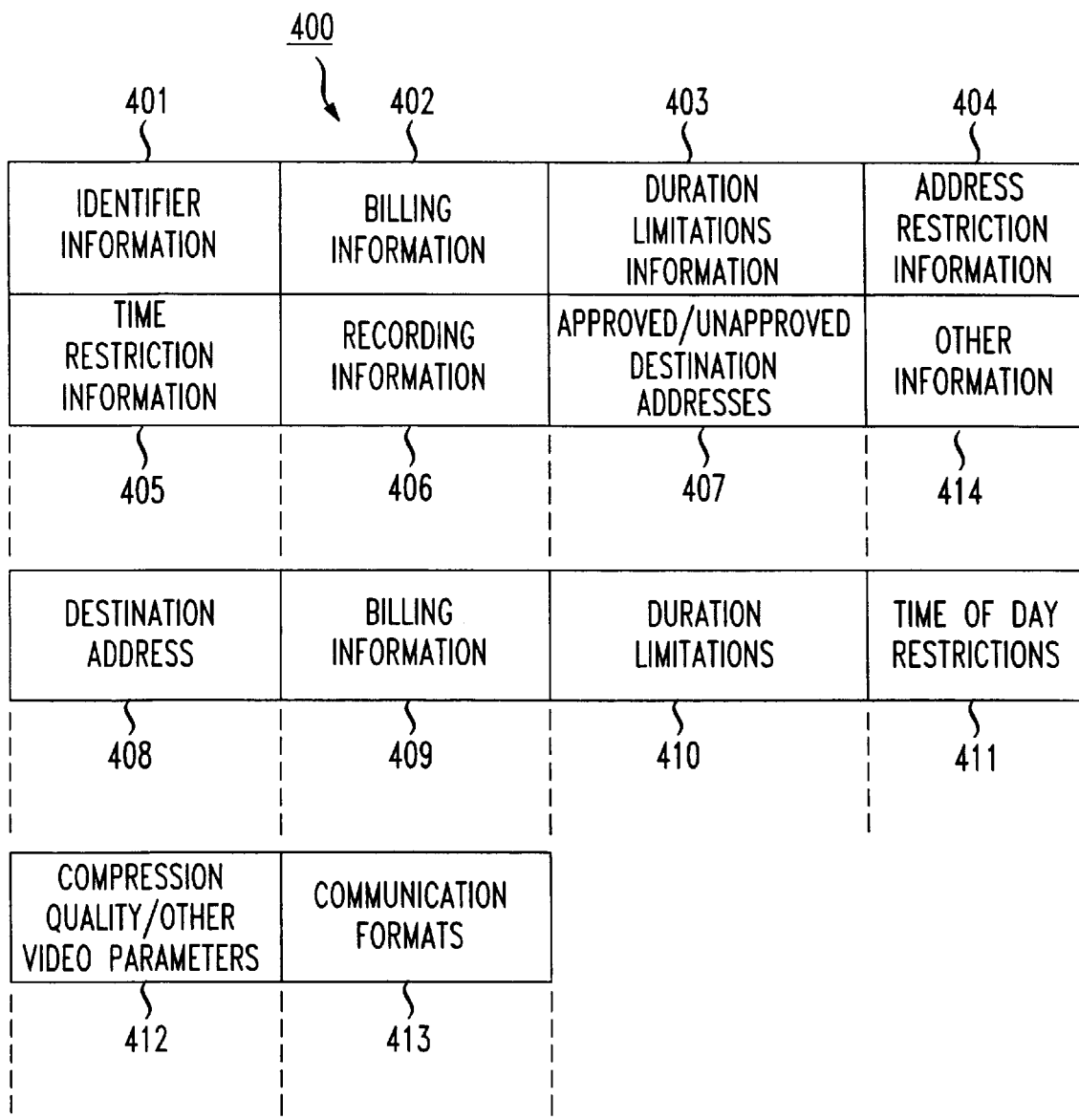
FIG. 4 is a diagram showing an example data structure of an embodiment of the present invention.

FIG. 4 illustrates a data structure 400 of the database 125 according to the present invention. As shown in FIG. 4, the data structure 400 contains a plurality of fields containing information for determining the special processing that is necessary for the call being placed. The data structure 400 includes, for example, a field 401 for the identifier information, a field 402 for billing information, a field 403 for duration limitation information, a field 404 for address restriction information, a field 405 for time restriction information, a field 406 for recording information, a field 407 for listing of approved/unapproved destination addresses, and a field 414 for other information required for proper processing of the communications. The data structure may further include fields directed to the quality and format of the communication such as field 412 for the compression, quality and other video parameters, and field 413 for communication formats. These fields are exemplary and are not meant to be exhaustive of the possible fields that may be included in the data structure. The type of fields are dependent on the particular uses of the invention and will change accordingly.

Also shown in FIG. 4 is a data structure relating to the particular destination address entered. This data structure includes, for example, a field 408 designating the destination address, a field 409 designating billing information, a field 410 designating duration limitation, and a field 411 designating time of day restrictions. Thus, with a combination of the identifier information and the destination address, large amounts of information may be compiled in database 125 for providing specialized processing of calls.

As described in the example applications above, these fields are accessed based on the identifier information received from the identifier signal and the address received from the address signal. These fields provide information to the processor 120 which uses the information to determine what special processing is necessary for the particular call being placed. Based on this information, the processor 120 routes the call through the appropriate special processor(s) that perform the special processing necessary.

Figure 5:
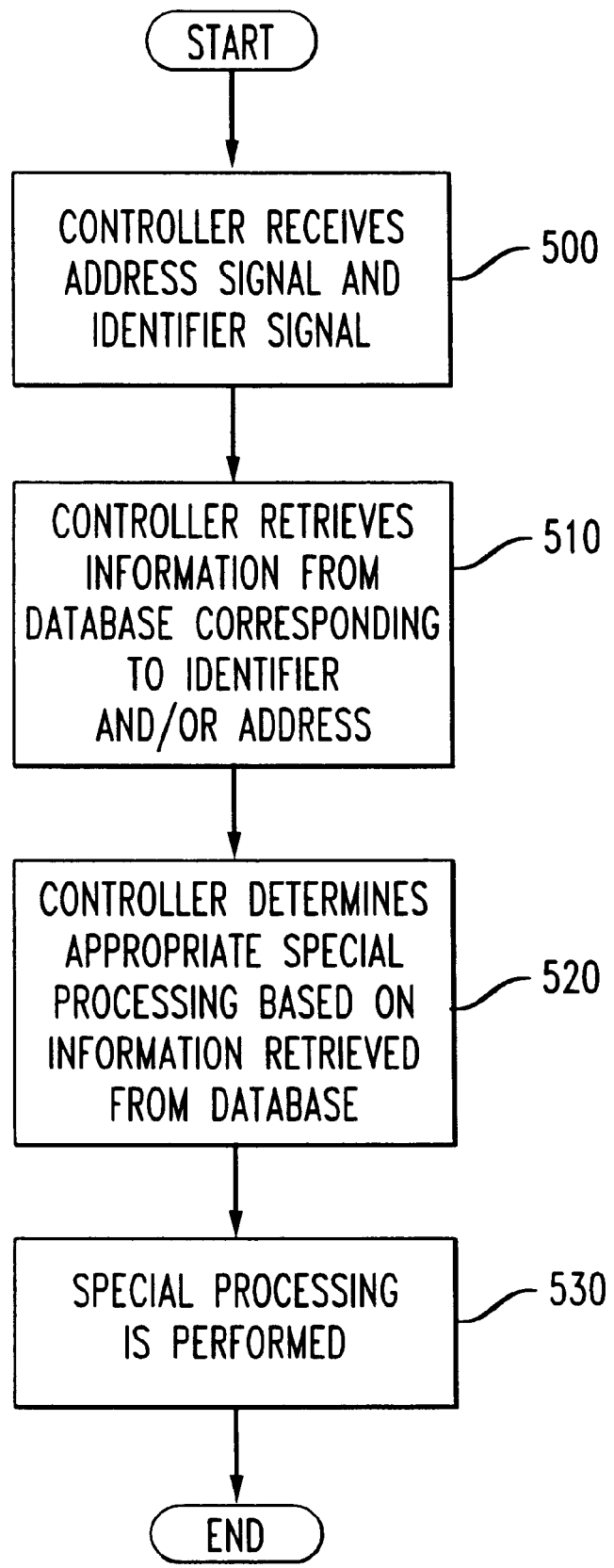
FIG. 5 is a flowchart showing the operation of the specialized processing system.

FIG. 5 is a flowchart of the operation of the special processor 120. As shown in FIG. 5, in step 500, the controller 200 receives the address signal and the identifier signal and goes to step 510. In step 510, the controller 200 retrieves, through database interface 220, information from the database 125 corresponding to the identifier signal and/or the address signal received.

Then, in step 520, the controller 200 determines the appropriate special processing necessary for the communication being made based on the database information retrieved. Next, in step 530, the controller 200 causes the special processing module 230 to perform the necessary special processing in accordance with the database information retrieved.

The above method of operation may be applied to any number of applications. The special processing will be dependent on the application. Furthermore, many special processing sequences may be combined to provide greater versatility in the processing of communications.

The following is an example implementation of the above system and method. In this implementation, a user activates their telephone (user device) by pressing the power button (such as on a wireless telephone). The user then enters a telephone number (destination address) via the telephone keypad. Once the telephone number is entered, an address signal and the identifier signal are sent to the specialized processor 120. The specialized processor 120 receives the signals and queries the database 125 for information corresponding to the identifier information of the identifier signal and/or the address information of the address signal. The specialized processor 120 then retrieves the information from the database 125 and, based on the information retrieved, performs the appropriate special processing on the communication and routes it to the destination address, i.e., user device 190.

As another example implementation of the above system and method, a user logs onto the Internet through his/her Internet Service Provider and enters an Internet address via a personal computer (user device 100) using an Internet browser. Based on the login ID of the user, entered when logging onto the Internet Service Provider, and the Internet address entered, the specialized processor 120 retrieves information from the database 125 to determine the type of special processing to be performed on the call to the Internet address. The special processor 120 then performs the special processing.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of processing a communication from a source device to a receiving device, comprising:

receiving a source device identifier signal;

retrieving first information from a database corresponding to the source device identifier signal;

receiving a destination address signal; and retrieving second information from the database corresponding to the destination address signal; and processing the communication based on the identifier signal and at least one of the first information and the second information.

2. The method of claim 1, wherein the source device identifier signal is at least one of a header on the destination address signal and a signal separate from the destination address signal.

3. The method of claim 1, wherein the source device identifier signal is automatically generated when a user device is activated.

4. The method of claim 1, wherein the source device identifier signal is automatically generated when the destination address signal is generated.

5. The method of claim 1, wherein the processing step includes at least one of restricting the communication to a predetermined duration, preventing the communication from being completed, providing a separate report of the communication, recording the communication, providing customized billing of the communication, selecting the quality of the communication and selecting the format of the communication.

6. The method of claim 1, wherein the first information includes at least one of billing information, call duration limitation information, address restriction information, time of day restrictions, recording information, approved destination address information, communication quality settings and restrictions and communication format settings and restrictions.

7. The method of claim 1, wherein the source device identifier signal identifies at least one of the source device and the type of communication.

8. A specialized communications processor operating in at least one network, comprising:

a network interface coupled to at least one network;

a database interface coupled to at least one database; and a controller coupled to the network interface and the database interface, wherein the controller receives an identifier signal containing an identifier of the source device through the network interface, retrieves first information corresponding to the identifier from a database through the database interface, receives a destination address signal containing a destination address, retrieves second information corresponding to the destination address from the database through the database interface and performs specialized processing based on the identifier and at least one of the first information and the second information.

9. The specialized communications processor of claim 8, wherein the controller receives the identifier signal from a user device and wherein the identifier signal is automatically generated when the user device is activated.

10. The specialized communications processor of claim 9, wherein the user device is one of a land-line telephone, a television device, a computer, a wireless telephone and a personal digital assistant.

11. The specialized communications processor of claim 8, wherein the identifier signal identifies at least one of a source of the communication and a type of communication.

12. The specialized communications processor of claim 8, wherein the specialized processing includes at least one of restricting the communication to a predetermined duration, preventing the communication from being completed, providing a separate report of the communication, recording the communication, providing customized billing of the communication, selecting the quality of the communication and selecting the format of the communication.

13. The specialized communications processor of claim 8, wherein the first information includes at least one of billing information, call duration limitation information, address restriction information, time of day restrictions, recording information, approved destination address information, communication quality settings and restrictions and communication format settings and restrictions.

14. A communications system operating in at least one network, comprising:

a specialized processor coupled to the at least one network;

a database coupled to the specialized processor; and a source device coupled to the at least one network, wherein the specialized processor receives an identifier signal containing an identifier from the source device, retrieves first information corresponding to the identifier of the database, receives a destination address signal containing a destination address, retrieves second information corresponding to the destination address from the database and performs specialized processing based on the identifier and at least one of the first information and second information.

15. The communications system of claim 14, wherein the source device automatically generates the identifier signal when the source device is activated.

16. The communications system of claim 15, wherein the source device is one of a land-line telephone, a television device, a computer, a cellular telephone and a personal digital assistant.

17. The communications system of claim 14, wherein the identifier signal identifies at least one of the source device and a type of communication.

18. The communications system of claim 14, wherein the specialized processing includes at least one of restricting the communication to a predetermined duration, preventing the communication from being completed, providing a separate report of the communication, recording the communication, providing customized billing of the communication, selecting the quality of the communication and selecting the format of the communication.

19. The method of claim 1, wherein the communication is processed based on both the first and second information.

20. The specialized communication processor of claim 8, wherein the specialized processing is performed based on both the first and second information.

21. The communications system of claim 14, wherein the specialized processing is performed based on both the first and second information.

* * * * *